(No Model.)

A. F. SCOVILLE & J. E. GENUNG.
STANCHION.

No. 498,862. Patented June 6, 1893.

Witnesses
C. A. Ford.
N. J. Riley

Inventors
Andrew F. Scoville, and
Joseph E. Genung.
By their Attorneys,
C. A. Snow & Co.

UNITED STATES PATENT OFFICE.

ANDREW F. SCOVILLE AND JOSEPH E. GENUNG, OF ATHENS, PENNSYLVANIA.

STANCHION.

SPECIFICATION forming part of Letters Patent No. 498,862, dated June 6, 1893.

Application filed December 28, 1892. Serial No. 456,549. (No model.)

*To all whom it may concern:*

Be it known that we, ANDREW F. SCOVILLE and JOSEPH E. GENUNG, citizens of the United States, residing at Athens, in the county of Bradford and State of Pennsylvania, have invented a new and useful Stanchion, of which the following is a specification.

The invention relates to improvements in stanchions.

The object of the present invention is to improve the construction of the means of operating stanchions, and to enable a number of stanchions to be operated simultaneously, or one or more to be operated without necessitating a person going between animals.

The invention consists in the construction and novel combination and arrangement of parts hereinafter fully described, illustrated in the accompanying drawings and pointed out in the claims hereto appended.

Figure 1:
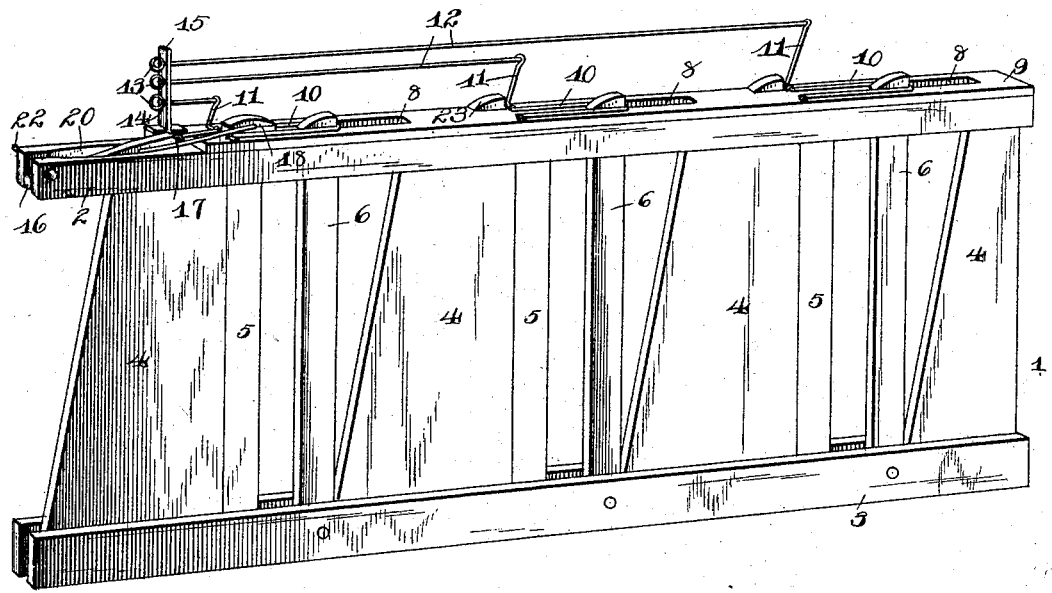
Figure 2:
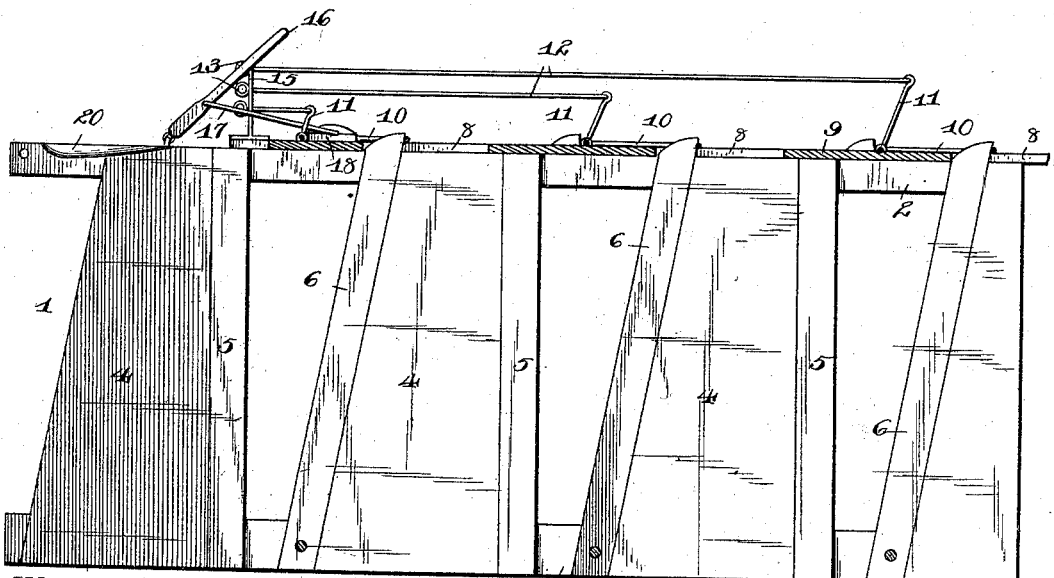

In the drawings—Figure 1 is a perspective view of a stanchion embodying the invention. Fig. 2 is a vertical longitudinal sectional view, the stanchions being open.

Like numerals of reference indicate corresponding parts in both the figures of the drawings.

1 designates a stanchion frame having upper and lower parallel longitudinal bars 2 and 3 and vertical truncated triangular boards 4 forming stanchion openings in each of which are arranged a rigid vertical stanchion bar 5, and a movable stanchion bar 6 operating in the usual manner to confine the neck of an animal. The rigid upright 5 has its ends secured between the parallel upper and lower longitudinal bars 2 and 3, and the removable stanchion bar 6 has its lower end pivoted between the longitudinal bars 3, at the bottom of the stanchion frame, and its upper end arranged loosely between the longitudinal bars 2 and projecting above the same.

Each movable stanchion bar has its upper end arranged in a slot 8 of a sliding horizontal bar 9, and engaged by a loop 10 which is mounted on the horizontal sliding bar, and adapted to confine the upper end of the movable stanchion bar at one end of the slot 8. The horizontal sliding bar 9 is mounted on the upper faces of the longitudinal bars 2, and is provided with a series of the slots 8, and the loops 10 are rectangular, and are hingedly connected with the horizontal sliding bar, and each loop is provided with an upwardly extending crank arm 11, and is secured to one end of a connecting rod 12, the other end of which terminates in a handle 13, and is arranged in a perforation 14 of a support or bracket arm 15. The sliding bar 9 is actuated by an operating lever 16 to move the stanchion bars 6 simultaneously to open all of the stanchions; and the operating lever 16 is fulcrumed on the top of the stanchion frame, and is connected by a U-shaped link 17 with the horizontal bar 9 which is provided with a block 18 to receive the connecting link. The longitudinal bars 2 are cut away at 20 to receive the operating lever which may be confined by a pin 22 to prevent longitudinal movement of the horizontal bar 9.

The connecting bars or draw rods 12 which terminate in handles are adapted for lifting the loops 10 to permit any particular one of the stanchions to be opened, and they enable some of the stanchions to be opened and the others to be left closed.

It will be seen that the attachment for operating the stanchion bars, is simple and comparatively inexpensive in construction, and effective in operation, that it is adapted to be readily applied to the ordinary construction of stanchions, and that it is capable of enabling the stanchions to be operated as desired.

Changes in the form, proportion and the minor details of construction may be resorted to without departing from the principle or sacrificing any of the advantages of this invention.

Stop blocks 23 may be arranged adjacent to the arms of the loops 10 to limit their movement, and to cause them to drop back upon the horizontal bar 9 when the draw rods are released.

Instead of employing the rigid draw rod for lifting the loops any other suitable connection, such as a cord, might be employed, and the loops will drop back by gravity.

What we claim is—

1. The combination with a stanchion frame having a series of rigid stanchion bars and companion movable stanchion bars, the upper ends of which project above the frame, of a horizontal bar slidingly mounted on the stanchion frame and provided with a series of slots receiving the projecting ends of the movable stanchion bars, a series of hinged loops mounted on the sliding bar and confining the movable stanchion bars, and provided with upwardly extending crank arms and means for lifting the loops independently of one another connected with the crank arms, substantially as described.

2. The combination with a stanchion frame having a series of rigid stanchion bars and companion movable stanchion bars, a sliding bar mounted on the top of the stanchion frame and provided with slots receiving the upper ends of the movable stanchion bars, a series of hinged loops mounted on the sliding bar and confining the movable stanchion bars and provided with upwardly extending crank arms, stop blocks mounted on the sliding bar and arranged adjacent to the crank arms, operating rods connected with the crank arms, an operating lever fulcrumed on the stanchion frame and connected with the sliding bar, and means for securing the operating lever, substantially as described.

3. The combination with a stanchion frame having a series of rigid stanchion bars and companion movable stanchion bars, a sliding bar mounted on top of the stanchion frame and provided with slots receiving the movable stanchion bars, a support mounted on the sliding bar and provided with a series of perforations, a series of loops hingedly connected to the sliding bar and confining the movable bars and provided with crank arms, a series of draw rods arranged in the perforations of the support, and each having one end connected with a crank arm, and its other end terminating in a handle, an operating lever fulcrumed on the frame and connected with the sliding bar, and means for securing the operating lever, substantially as described.

In testimony that we claim the foregoing as our own we have hereto affixed our signatures in the presence of two witnesses.

ANDREW F. SCOVILLE.
    JOSEPH E. GENUNG.

Witnesses:
 LOUIS HOYT,
 FRANK G. SAIRS.